United States Patent [19]

Scheifele

[11] 3,732,605
[45] May 15, 1973

[54] METHOD OF MAKING ROLLER BEARING CAGE-AND-ROLLER UNIT

[76] Inventor: Hudson B. Scheifele, 30651 Ponds View Drive, Franklin, Mich. 48025

[22] Filed: Nov. 3, 1971

[21] Appl. No.: 195,188

[52] U.S. Cl. ............................29/148.4 C, 113/117
[51] Int. Cl. ...............................................B21d 53/12
[58] Field of Search ................29/148.4 C, 148.4 A, 29/148.4 R; 113/117

[56] References Cited

UNITED STATES PATENTS

| 1,645,866 | 10/1927 | Lothrop | 113/117 |
| 2,122,365 | 6/1938 | Beck | 29/148.4 C |

Primary Examiner—Thomas H. Eager
Attorney—Willis Bugbee

[57] ABSTRACT

An annular sheet-metal roller-riding cage has a tubular portion with a multiplicity of circumferentially-spaced openings providing pockets for the rollers. Each opening or pocket has opposite cage-support surfaces disposed tangential to the roller mounted therein. The rollers are held in assembly by a corresponding number of L-shaped tabs, two for each roller, with arms extending radially from the tabular portion of the cage and located at the opposite ends of the roller. The free ends of the L-shaped tabs form tongues extending axially toward one another from the opposite sides of the tubular portion and are disposed at the opposite side of the pitch circle of the set of rollers from the tubular portion of the cage, thereby effecting retention of the rollers in the cage. The opposite sides of the tongues have surfaces converging toward the tubular portion. The tubular portion of the cage is positioned inward of the pitch circle of rollers seated in a two-flanged inner race, or outward of the pitch circle of rollers seated in a two-flanged outer race. Before assembly, the L-shaped tabs are disposed at obtuse angles to the tubular portion of the cage. Upon inserting the rollers in the pockets and seating them in a roller bearing race having fixed flanges on both ends, the opposite sets of roller-retaining tabs are bent axially toward one another to place their free ends or tongues between the rollers for retention and spacing thereof. This assembly is then mounted in a race with a fixed flange on one end and with a flangeless opposite end. The invention thus provides a roller-riding cage with a minimum clearance between it and the lowermost rollers yet accurately located in a radial direction. This is done by causing the normal flat surfaces of the cage support portion on the roller pockets to come into contact with the body of the rollers adjacent the periphery of the tubular portion of the cage which is closest to the pitch circle of the set of rollers so as to minimize the clearance between the cage support surface and the rollers for a given radial movement of the cage.

3 Claims, 10 Drawing Figures

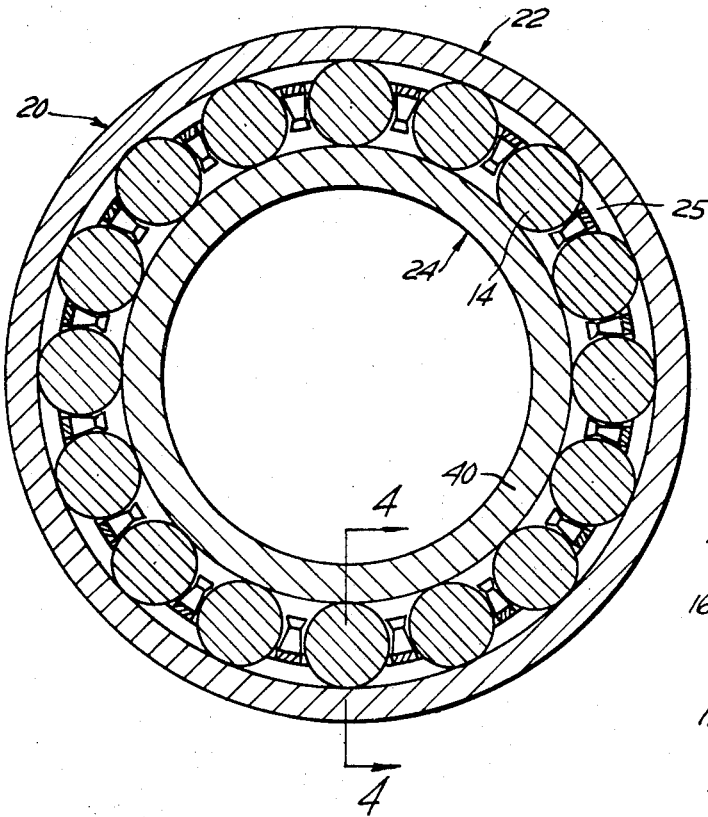
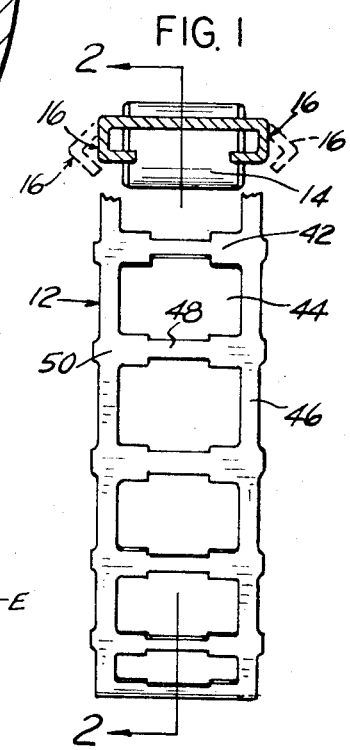
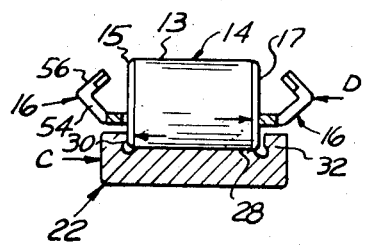
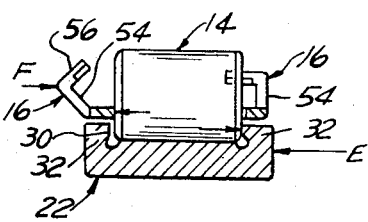
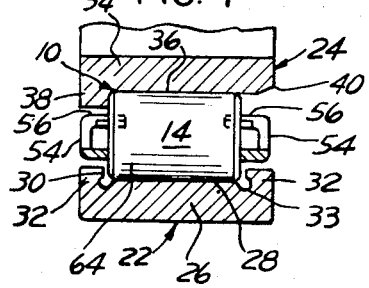

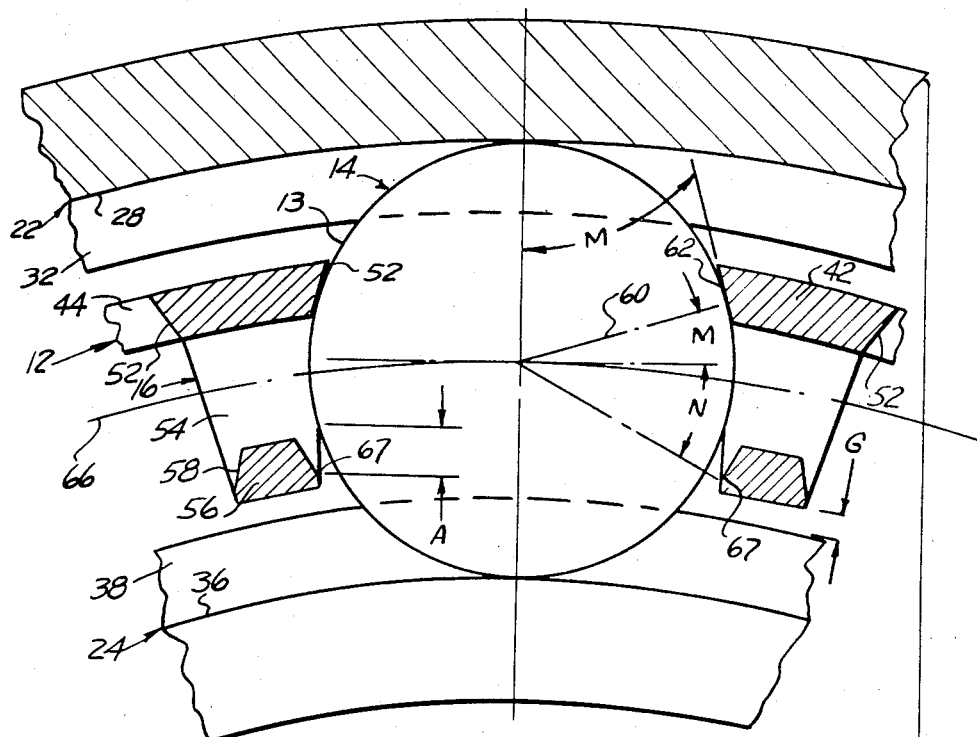
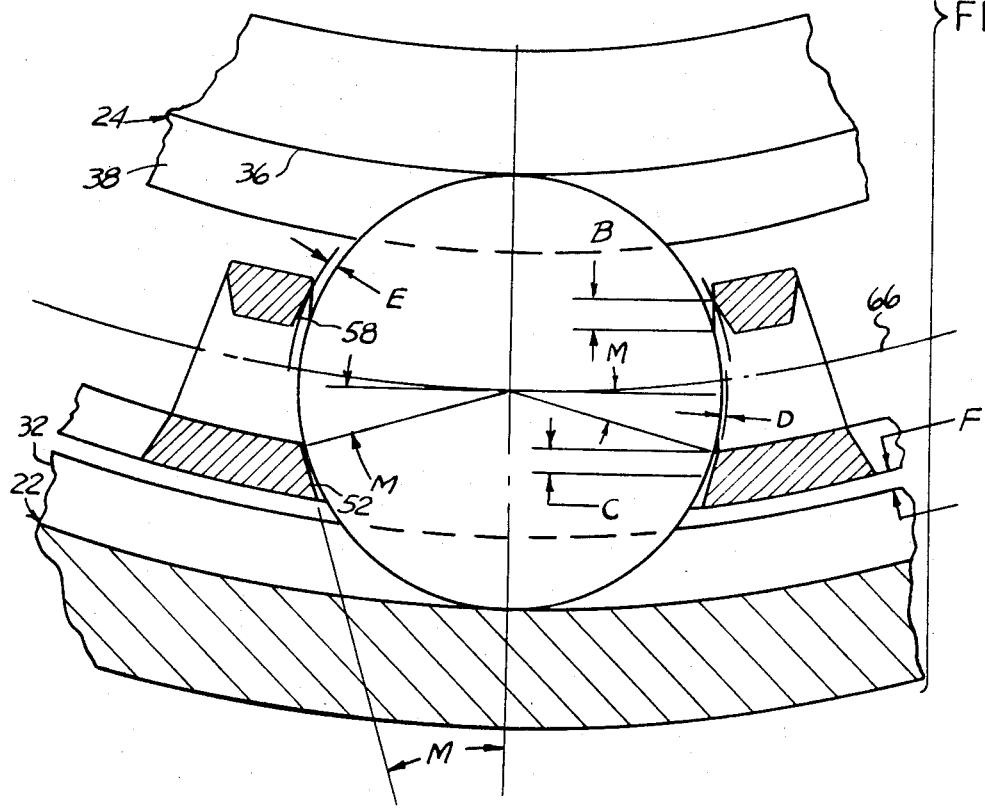
FIG.5

PATENTED MAY 15 1973 3,732,605

METHOD OF MAKING ROLLER BEARING CAGE-AND-ROLLER UNIT

In the drawings,

FIG. 1 is a side elevation, partly in vertical section, of cage-and-roller unit adapted for insertion in the double-flanged outer race of the roller bearing of the present invention and assembly by the method of the present invention, with the position of each roller retaining tab, prior to assembly of the rollers therein, shown in dotted lines;

FIG. 2 is a cross-section through an assembled roller bearing, according to the present invention, taken along the line 2—2 in FIG. 1 with the rollers, however, shown in end elevation to simplify the drawing;

FIGS. 3A and 3B show the successive steps in bending toward one another the opposite roller retaining tabs when assembling a set of rollers in an outer race having two fixed flanges for use with an inner race having a single fixed flange;

FIG. 4 is a view similar to FIGS. 3A and 3B, but taken along the line 4—4 in FIG. 2, with the parts in their finally-assembled positions, and showing a single-flanged inner race fitted thereto;

FIG. 5 is a fragmentary cross-section of the top and bottom portions of FIG. 2 upon a greatly enlarged scale, showing the uppermost and lowermost rollers and their retaining tabs together with the outer and inner races and the geometrical relationships therein, together with the roller drop control obtained according to the present invention;

Figure 7:
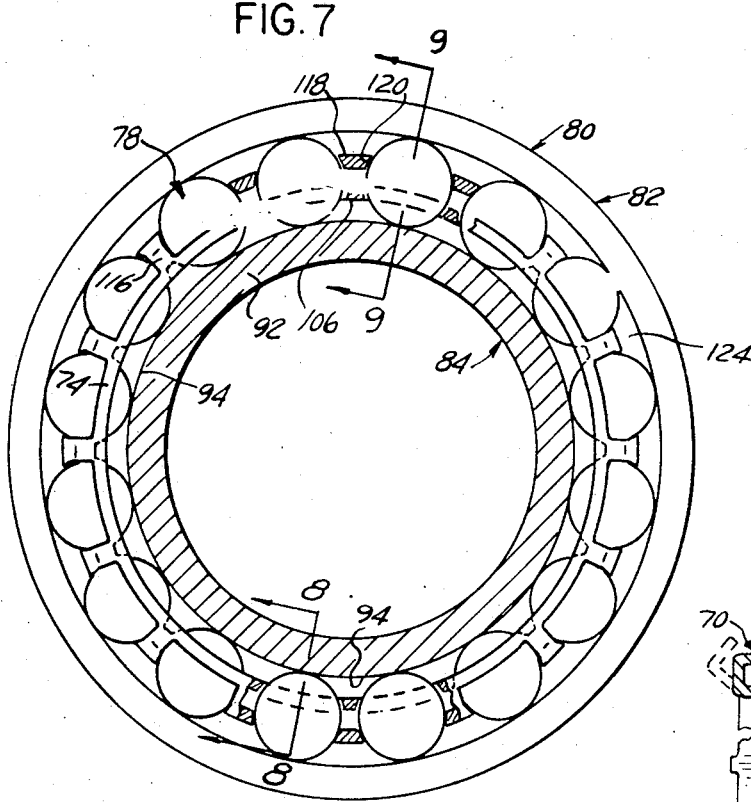
Figure 8:
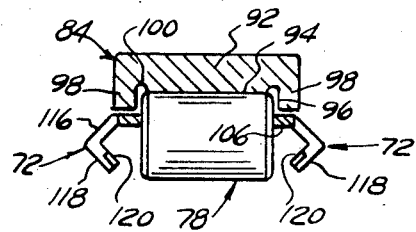
Figure 9:
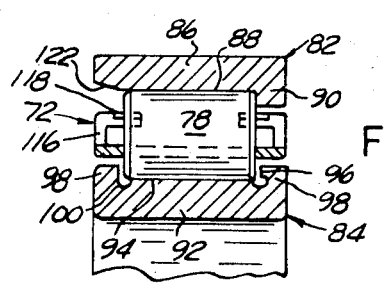
Figure 6:
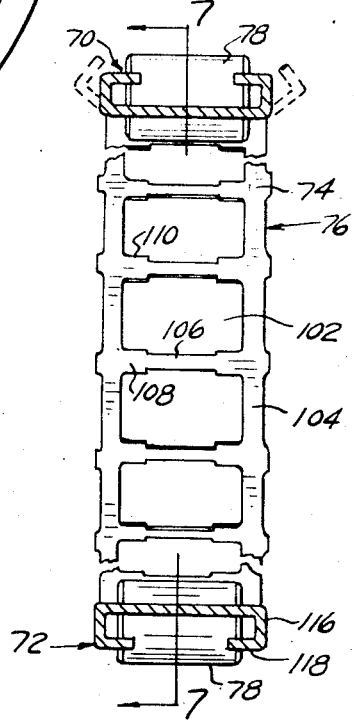
FIG. 6 is a view similar to FIG. 1 but showing in side elevation, partly in vertical section, a cage-and-roller unit adapted for insertion in a double-flanged inner race for use with a single-flanged outer race in the roller bearing of the present invention, with all but the uppermost and lowermost rollers omitted in order to simplify the disclosure.

FIG. 7 is a cross-section similar to that of FIG. 2 but taken along the line 7—7 in FIG. 6 with the rollers also shown in end elevation to simplify the drawing; and FIGS. 8 and 9 are views similar to FIGS. 3A and 4 respectively, but showing the successive positions of the opposite roller-retaining tabs before and after being bent axially toward one another during and after assembly of the rollers in a roller bearing with a double-flanged inner race and a single-flanged outer race, FIG. 8 being taken along the line 8—8 in FIG. 7 and FIG. 9 being taken along the line 9—9 therein.

Referring to the drawings in detail, FIG. 1 shows a cage-and-roller unit, generally designated 10, consisting of an annular sheet metal roller-riding cage 12 equipped with a set of rollers 14 with cylindrical surfaces 13, with opposite end bevels 15 and ends 17. Only one of the rollers 14 is shown in FIG. 1 in order to avoid concealing other parts of the assembly. In FIG. 1, the cage 12 is in radial section in order to show the cross-sectional appearance and construction thereof, with the L-shaped tabs 16 of the cage facing inward toward the axis of the unit 10 and shown in dotted lines in the positions they occupy prior to the mounting of the rollers into the cage and in solid lines subsequent thereto. The cage and roller assembly 10 is shown in FIG. 2 when equipped with a full complement of rollers 14 after the assembly thereof in the cage 12 and after mounting in a roller bearing 20 having an outer race 22, an inner race 24 and an annular roller space 25 between them. The outer race 22 (FIG. 4) has an annular central portion 26 provided with a precisely-machined cylindrical internal roller path surface 28 within an annular internal channel 30 between spaced annular fixed flanges 32 disposed at both ends thereof and separated therefrom by annular grooves 33. The inner race 24, on the other hand, has a central portion 34 provided with a precisely-machined cylindrical external roller path surface 36 having an annular fixed flange 38 at only one end thereof, the opposite end being open, i.e. without a flange, at 40. These flanges are also termed "ribs" in this art.

Each cage 12 includes a tubular peripheral portion 42 containing approximately rectangular openings or rollers pockets 44. The tubular portion 42 consists of axially-spaced annular end portions 46 interconnected by axial bridge or cage-support portions 48 provided at their outer ends with widened cage-support enlargements 50 having flat inwardly-converging cage support surfaces 52 (FIG. 5). Depending obliquely from the enlargements 50 prior to roller assembly (and depending radially after roller assembly) are the L-shaped roller-retaining tabs 16 (FIGS. 1 and 3a). Each tab 16 after roller assembly (FIG. 4) has an arm 54 projecting radially inward and a tongue 56 projecting axially toward the opposite end of the cage. Each tongue 56 has flat outwardly-converging roller-retaining side surfaces 58. The cage support surfaces 52 of the roller pockets or openings 44 are so inclined that they are tangential (i.e. perpendicular or normal) to the radii 60 of their respective rollers 14 at their mutual lines of contact 62 (FIG. 5). The geometrical relationships of the cage support surfaces 52 and the surfaces 58 of the tongues 56 of the L-shaped tabs 16 are such as to satisfy the following two cage requirements simultaneously:

First, to obtain a satisfactory control over "roller drop," namely the amount of downward displacement of the rollers relatively to the pockets by the force of gravity when one of the bearing races has been removed; and Second, to insure that the roller retaining surfaces 58 on the tongues 56 of the L-shaped tabs 16 do not engage the cylindrical surfaces 13 of the rollers 14 during running.

The fulfillment of the first condition enables the rollers 14 to be controlled in the cage 12 without causing difficulty during assembly of the roller bearing 20, whereas the fulfillment of the second condition eliminates the possibility of excessive wear or failure, from fatigue, of the L-shaped tabs 16 during running. In order to satisfy the above conditions, the flat tangential cage support surfaces 52 of the roller pockets 44 must engage the roller surfaces 13 in a line of contact 62 creating the smallest permissible roller contact angle M, and the line of contact 67 on the roller retaining surfaces 58 of the tongues 56 must create the largest permissible angle N when the cage 12 is riding on the uppermost roller 14 (FIG. 5) so as to minimize the "roller drop." In FIG. 5, the "roller drop" A is equal to the sum of the dimensions B and C. B is the vertical distance between the roller contact line 67 on the roller retaining surface 58 and the roller surface 13 when the roller is central in the pocket. B is at its maximum when the minimum minor axis of the assumed out-of-round cage 12 spans the uppermost and lowermost rollers and the angle N is at its minimum. C is the vertical distance between the roller contact line 62 on the cage supporting surface 52 and the roller surface 13 when the roller is central in the pocket. C at its maximum is equal to the sum of the maximum permissible out-of-roundness of the cage 12 and the vertical cage movement producing the minimum permissible clearance between the roller pocket surfaces 52 and the lowermost roller surface 13 when the minimum minor cage axis spans the uppermost and lowermost rollers and the cage 12 is riding on the uppermost roller 14 after the cage-and-roller unit 10 has been mounted in inner and outer bearing races 22 and 24. D and E are the radial distances from the surface 13 of the lowermost roller 14 to its points of contact 62 and 67 with the surfaces 52 and 58 of the lowermost L-shaped tab 16 when the cage 12 is riding on the uppermost roller 14, as shown in FIG. 5, and the roller is central in the pocket. E must always exceed D to prevent the undesired contact between the rollers and the tongues 56. F is the minimum permissible clearance between the tubular cage portion 42 and the flange 32 of the adjacent bearing race 22 when the cage and roller unit 10 is mounted between the races 22 and 24 while G is the corresponding clearance between the tongues 56 and the flange 38 of its adjacent bearing race 24.

The cage 12 is stamped from sheet steel in a progressive die set (not shown) as an elongated flat strip containing the roller pockets 44 the surfaces 52 of which are swaged to their desired angles. The die set bends the initially flat tabs 16 into their final L-shaped forms projecting obliquely from the tubular-portion-to-be 42. The elongated flat strip is then bent into cylindrical shape, and its opposite ends butt-welded.

A set of rollers 14 is then placed in the pockets 44 between the opposing pairs of oblique L-shaped tabs 16 and engaging the internal channel 30 (FIG. 3A). A bending force indicated by the arrow D is then applied against all of the L-shaped tabs 16 opposite the abutment represented by the arrow C, whereby these tabs 16 are bent from their oblique initial positions (FIG. 3A) to their perpendicular or radial final positions (FIG. 3B). The outer race 22 is then held against a fixed abutment on its opposite side, indicated by the arrow E (FIG. 3B) while a bending force indicated by the arrow F is applied to the remaining oblique L-shaped tabs 16, bending them from the oblique positions shown at the left-hand end of FIG. 3B into their perpendicular positions with the arms 54 disposed radially and with the tongues 56 disposed axially between adjacent rollers (FIG. 4). The inner race 24 may then be slid into place by moving it axially between the now-caged rollers 14. The cage and roller unit 10 is itself adaptable, salable and usable without one or the other of the outer or inner races 22 or 24, such as, for example, as a shaft bearing where the shaft itself serves as the inner race.

In FIGS 6 and 9 inclusive, are shown the successive steps of forming a cage and roller unit, generally designated 70, in a similar manner to that just described but with the L-shaped tabs 72 now facing outward from the tubular portion 74 of the cage 76. The cage and roller assembly 70 is shown in FIGS. 6 and 7 when equipped with a full complement of rollers 78, only the upper and lower rollers 78 being shown in FIG. 6 to simplify the disclosure. The cage and roller assembly 70 is shown in FIG. 7 after mounting in a roller bearing 80 having a single flanged outer race 82 and a double-flanged inner race 84. The inner race 84 (FIG. 9) has an annular central portion 92 provided with a precisely-machined cylindrical external roller path surface 94 within an annular external channel 96 between axially-spaced annular fixed flanges 98 disposed at both ends thereof and separated therefrom by annular grooves 100. The tubular portion 74 of the roller cage 76 has circumferentially-spaced approximately rectangular openings 102 forming roller pockets between annular end portions 104 and axial bridge or cage-support portions 106 with widened cage-support end enlargements 108. The end enlargements 108 have flat outwardly-converging cage support surfaces 110 (FIG. 6) which are, as before, tangential to the radii 60 of their respective rollers 78 at their mutual lines of contact 62. The L-shaped tabs 72, as before, have radial arms 116 terminating in axially-projecting tongues 118. The arms 116, however, now project radially outward rather than inward and their tongues 118 have inwardly-converging roller-retaining side surfaces 120.

The cage 76 (FIG. 6), like the cage 12 (FIG. 1), is in the form of a stamping from sheet steel with the openings or pockets 102 and tabs 72 in the same flat plane, but with the tongues 118 now wider than the bridge portions 106 between the pockets 102. As before, a progressive die set (not shown) forms the L-shaped tabs 72 and bends them into positions disposed at obtuse angles to their respective bridge portions 106 (FIG. 8). The strip is then bent into cylindrical shape and its opposite ends butt-welded with their tabs 72 projecting radially outward. The flat surfaces 110 and 120 are formed by swaging, prior to the bending operations, as were the surfaces 52 and 58 of the inwardly-projecting L-shaped tabs 16 of FIGS. 1 to 5 inclusive.

The assembly of the cage and roller unit 70 includes the placing of a full complement of rollers 78 in the openings or roller pockets 102 between the outwardly-projecting L-shaped tabs 72 (FIG. 8) with the rollers disposed within the external annular channel 96 of the inner race 84 and resting on the cylindrical roller path surface 94 (FIG. 9). As before, axial bending forces are imposed successively upon each of the L-shaped tabs 72 while the roller 78 rests against the opposing flange 98 of the inner race 84 as an abutment. In this manner, the arms 116 of the L-shaped tabs 72 are bent from their obtuse-angled positions of FIG. 8 to their radial positions of FIG. 9. The geometry involved in the cage and roller unit 70 is similar to that described above in connection with FIG. 5 except that the L-shaped tabs 72 now face outward whereas the L-shaped tabs 16 face inward.

The cages 12 of FIG. 1 and 76 of FIG. 6 are preferably roller-riding cages, and are so shown. A roller-riding cage, as its name signifies, is one which rests upon and rides upon the rollers of the bearing during operation thereof, in distinction to race-riding cages which rest upon and ride upon the side flanges or "ribs" of one of the races. A roller-riding cage is preferred because by riding on the rollers it stabilizes the rollers and tends to prevent skewing thereof. Moreover, since the roller-riding cage does not at any time contact the race flanges, the cage does not require hardening. Wear on the cage support surfaces in the roller pockets is unimportant and very small in a well-lubricated bearing because a film of oil is easily maintained between the peripheral surface of the roller 14 and the cage support surface 52 of the roller pocket 44.

In the present invention, the cage support surfaces 52 of the outer-race-held cage 12 (FIGS. 1 to 5 inclusive)

and the corresponding cage support surfaces 110 of the inner-race-held cage 76 (FIGS. 7 to 9 inclusive) are preferably located as close as possible to the pitch circle of the rollers, namely the circle passing through the axes of the rollers, because such location is most effective in preventing skewing of the rollers during operation. The cage support surfaces of course cannot be located exactly on the roller pitch circle because in that event the rollers would pass through the roller pockets or openings 44 and 102. At the same time, however, a clearance must be maintained between the cage support surfaces 52 and 110 and the rollers 14 and 78 respectively because of the necessity of making allowance for the out-of-roundness which is inevitable in the manufacture of cage stampings. Without such clearances, the cage might lock up on the rollers. Furthermore, the clearance of the tongues of the L-shaped tabs must exceed the clerance on the tubular support portions to avoid contact between the rollers and the tongues, with consequent fatigue of the tongues by vibration and the eventual breaking off of the tongues. In either form of the invention (FIG. 4 vs. FIG. 9), it will be observed that the tongues 56 or 118 are always positioned adjacent the single flange races 24 or 82.

The "roller drop" previously referred to occurs when the inner race 24 (FIG. 4) is removed so that the topmost roller 14 no longer supports the cage 12. Roller drop, however, must not be permitted to become excessive, otherwise it interferes with the assembling of the bearing in that the race engages the flat end of the roller rather than the beveled edge thereof and the rollers consequently do not move radially to permit entry of the race. The tongues on the L-shaped tabs project cantilever-like toward one another from both sides of the cabe 12 in controlling roller drop and roller tilting during assembly of the roller bearing. In a properly manufactured bearing, the tongues never ride on the rollers during operation, so that consequent vibration, fatigue and breakage are not accelerated. The tongues 56 or 118 are located at such distances from the lines of contact 62 of the rollers 14 with the cage support surfaces 52 that they prevent the ends 17 of the rollers 14 from engaging the ends of the races 22 or 24 during assembly and instead cause the bevels 15 on the ends of the rollers 14 to engage the bevelled open ends 40 or 122 of their respective single-flanged races 24 or 82 and deflect the rollers 14 into the annular spaces 25 or 124 between the races.

I claim:

1. A method of making a cage-and-roller unit for a cylindrical roller bearing comprising forming a hollow cylindrical sheet metal member with a tubular portion containing a multiplicity of circumferentially-spaced approximately rectangular roller pocket openings having axially-extending bridge portions with roller-engaging surfaces inclined oppositely relatively to one another on the circumferentially-spaced opposite edges thereof and with tabs projecting axially in opposite directions from the opposite ends of said bridge portions, bending said tabs into approximately L-shaped form with arm portions disposed at obtuse angles to said bridge portions and with tongue portions substantially perpendicular to said arm portions, mounting a set of cylindrical bearing rollers in said openings, and holding said rollers in said openings while bending said arm portions of said tabs substantially radial to said bridge portions and thereby swinging said tongue portions into the circumferential spaces between said rollers.

2. A method of making a cage-and-roller unit for a cylindrical roller bearing, according to claim 1, including forming roller-retaining surfaces inclined oppositely relatively to one another on the circumferentially-spaced opposite edges of said tongues.

3. A method of making a cage-and-roller unit for a cylindrical roller bearing, according to claim 1, wherein said bending of said arm portions includes bending all of said arm portions on one side of said cage substantially radial to said bridge portions simultaneously and thereby swinging all of said tongue portions on said one side of said cage simultaneously into said circumferential spaces between said rollers while supporting said cage axially by the ends of said rollers, and also includes bending all of said arm portions on the opposite side of said cage in a like manner to said first-mentioned bending.

* * * * *